(12) United States Patent
Dengler et al.

(10) Patent No.: US 8,095,565 B2
(45) Date of Patent: Jan. 10, 2012

(54) METADATA DRIVEN USER INTERFACE

(75) Inventors: Patrick M. Dengler, Redmond, WA (US); Arvind K. Krishnan, Hyderabad (IN); Jagdish Singh, Hyderabad (IN); Lawrence M. Sanchez, Kirkland, WA (US); Sai Shankar, Hyderabad (IN); Satish Kumar Chittamuru, Hyderabad (IN); Zoltan Pekic, Redmond, WA (US); Nabarun Mondal, Hyderabad (IN); Namendra Kumar, Hyderabad (IN); Ricard Roma i Dalfó, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/418,829

(22) Filed: May 5, 2006

(65) Prior Publication Data

US 2007/0130205 A1 Jun. 7, 2007

Related U.S. Application Data

(60) Provisional application No. 60/742,240, filed on Dec. 5, 2005.

(51) Int. Cl.
G06F 17/30 (2006.01)
(52) U.S. Cl. .......................................... 707/796; 715/745
(58) Field of Classification Search .................. 707/102, 707/104.1, 999.102, 999.104, 625, 796; 715/744, 715/745
See application file for complete search history.

(56) References Cited

U.S. PATENT DOCUMENTS

| | | | |
|---|---|---|---|
| 5,257,577 A | 11/1993 | Clark | 100/99 |
| 5,594,660 A | 1/1997 | Sung et al. | 715/500.1 |
| 5,606,609 A | 2/1997 | Houser et al. | 713/179 |
| 5,848,404 A | 12/1998 | Hafner et al. | 707/3 |
| 5,893,092 A | 4/1999 | Driscoll | 707/5 |
| 5,933,851 A | 8/1999 | Kojima et al. | 711/133 |
| 5,960,383 A | 9/1999 | Fleischer | 704/9 |
| 6,012,053 A | 1/2000 | Pant et al. | 707/3 |
| 6,032,196 A | 2/2000 | Monier | 709/245 |

(Continued)

FOREIGN PATENT DOCUMENTS

EP 0950961 A2 10/1999

(Continued)

OTHER PUBLICATIONS

Najork, Marc et al., "Breadth-First Crawling Yields High-Quality Pages", ACM, Compaq Systems Research Center, Hong Kong, 2001, pp. 114-118.

(Continued)

*Primary Examiner* — James Trujillo
*Assistant Examiner* — Jorge A Casanova
(74) *Attorney, Agent, or Firm* — Merchant & Gould (57) ABSTRACT

Metadata is used to create customized user interface (UI) portions for an application. The metadata may be XML-based and can be interpreted and then rendered to implement a customized UI that also supports data binding between data and the UI controls. Once created, the metadata is processed by a rendering engine to display the UI controls. An interpreter may be used to interpret the metadata file before it is sent to the rendering engine. Neither the rendering engine nor the interpreter needs knowledge of the host application and provides support for arbitrary metadata driven UI. The metadata schema may include mechanisms to create custom controls for the UI; programmatically modify the UI controls by providing access to a code-behind assembly as well as support event handling for the UI controls.

20 Claims, 6 Drawing Sheets

U.S. PATENT DOCUMENTS

| | | | |
|---|---|---|---|
| 6,070,191 A | 5/2000 | Narendran et al. | 709/226 |
| 6,098,064 A | 8/2000 | Pirolli et al. | 707/2 |
| 6,125,361 A | 9/2000 | Chakrabarti et al. | 707/3 |
| 6,128,701 A | 10/2000 | Malcolm et al. | 711/133 |
| 6,145,003 A | 11/2000 | Sanu et al. | 709/225 |
| 6,158,044 A | 12/2000 | Tibbetts | 717/1 |
| 6,182,085 B1 | 1/2001 | Eichstaedt et al. | 707/104.1 |
| 6,185,558 B1 | 2/2001 | Bowman et al. | 707/5 |
| 6,240,408 B1 | 5/2001 | Kaufman | 707/3 |
| 6,247,013 B1 | 6/2001 | Morimoto | 707/10 |
| 6,285,999 B1 | 9/2001 | Page | 707/5 |
| 6,304,864 B1 | 10/2001 | Liddy et al. | 706/15 |
| 6,317,741 B1 | 11/2001 | Burrows | 707/5 |
| 6,351,467 B1 | 2/2002 | Dillon | 370/432 |
| 6,351,755 B1 | 2/2002 | Najork et al. | 707/501.1 |
| 6,356,933 B2* | 3/2002 | Mitchell et al. | 709/203 |
| 6,360,215 B1 | 3/2002 | Judd et al. | 707/3 |
| 6,385,602 B1 | 5/2002 | Tso et al. | 707/3 |
| 6,389,436 B1 | 5/2002 | Chakrabarti et al. | 715/513 |
| 6,418,433 B1 | 7/2002 | Chakrabarti et al. | 707/5 |
| 6,418,452 B1 | 7/2002 | Kraft et al. | 707/200 |
| 6,418,453 B1 | 7/2002 | Kraft et al. | 707/200 |
| 6,442,606 B1 | 8/2002 | Subbaroyan et al. | 709/224 |
| 6,484,204 B1 | 11/2002 | Rabinovich | 709/226 |
| 6,539,376 B1 | 3/2003 | Sundaresan et al. | 707/5 |
| 6,547,829 B1 | 4/2003 | Meyerzon et al. | 715/501.1 |
| 6,549,897 B1 | 4/2003 | Katariya et al. | 707/5 |
| 6,594,682 B2 | 7/2003 | Peterson et al. | 718/102 |
| 6,598,051 B1 | 7/2003 | Wiener et al. | 7/100 |
| 6,622,140 B1 | 9/2003 | Kantrowitz | 707/5 |
| 6,631,497 B1* | 10/2003 | Jamshidi et al. | 715/205 |
| 6,638,314 B1 | 10/2003 | Meyerzon et al. | 715/234 |
| 6,738,764 B2 | 5/2004 | Mao et al. | 707/5 |
| 6,766,422 B2 | 7/2004 | Beyda | 711/137 |
| 6,826,581 B2* | 11/2004 | Moslander et al. | 1/1 |
| 6,871,202 B2 | 3/2005 | Broder | 707/7 |
| 6,883,135 B1 | 4/2005 | Obata et al. | 715/202 |
| 6,886,010 B2 | 4/2005 | Kostoff | 707/3 |
| 6,961,900 B1 | 11/2005 | Sprague et al. | 715/513 |
| 6,973,490 B1 | 12/2005 | Robertson et al. | 709/224 |
| 7,016,540 B1 | 3/2006 | Gong et al. | 382/225 |
| 7,028,029 B2 | 4/2006 | Kamvar et al. | 707/5 |
| 7,062,502 B1* | 6/2006 | Kesler | 707/102 |
| 7,076,483 B2 | 7/2006 | Preda et al. | 707/5 |
| 7,080,073 B1 | 7/2006 | Jiang et al. | 707/7 |
| 7,139,983 B2* | 11/2006 | Kelts | 715/802 |
| 7,181,438 B1 | 2/2007 | Szabo | 707/2 |
| 7,203,678 B1* | 4/2007 | Petropoulos et al. | 707/4 |
| 7,243,102 B1 | 7/2007 | Naam et al. | 707/7 |
| 7,246,128 B2 | 7/2007 | Jordahl | 707/100 |
| 7,281,002 B2 | 10/2007 | Farrell | 707/3 |
| 7,293,253 B1* | 11/2007 | Soukup | 717/108 |
| 7,328,401 B2 | 2/2008 | Obata et al. | 707/3 |
| 7,472,375 B2* | 12/2008 | Ye et al. | 717/106 |
| 2002/0078045 A1 | 6/2002 | Dutta | 707/7 |
| 2002/0099694 A1 | 7/2002 | Diamond et al. | 707/3 |
| 2002/0100017 A1* | 7/2002 | Grier et al. | 717/120 |
| 2002/0103798 A1 | 8/2002 | Abrol et al. | 707/5 |
| 2002/0107886 A1 | 8/2002 | Gentner et al. | 707/511 |
| 2002/0129014 A1 | 9/2002 | Kim et al. | 707/5 |
| 2003/0037074 A1 | 2/2003 | Dwork et al. | 707/500 |
| 2003/0074368 A1 | 4/2003 | Schuetze et al. | 707/103 R |
| 2003/0217052 A1 | 11/2003 | Rubenczyk et al. | |
| 2003/0221165 A1 | 11/2003 | Young et al. | 715/505 |
| 2004/0056894 A1* | 3/2004 | Zaika et al. | 345/762 |
| 2004/0181515 A1 | 9/2004 | Ullmann et al. | 707/3 |
| 2004/0199497 A1 | 10/2004 | Timmons | 707/3 |
| 2004/0230572 A1 | 11/2004 | Omoigui | 707/3 |
| 2004/0254932 A1 | 12/2004 | Gupta et al. | 707/7 |
| 2005/0044071 A1 | 2/2005 | Cho et al. | 707/3 |
| 2005/0055347 A9 | 3/2005 | Cho et al. | 707/5 |
| 2005/0071328 A1 | 3/2005 | Lawrence | 707/3 |
| 2005/0071741 A1 | 3/2005 | Acharya et al. | 715/500 |
| 2005/0086192 A1 | 4/2005 | Kodama | 707/1 |
| 2005/0086206 A1 | 4/2005 | Balasubramanian et al. | 707/3 |
| 2005/0086583 A1 | 4/2005 | Obata et al. | 715/229 |
| 2005/0091576 A1 | 4/2005 | Relyea et al. | 715/502 |
| 2005/0108699 A1* | 5/2005 | Olander et al. | 717/166 |
| 2005/0144162 A1 | 6/2005 | Liang | 707/3 |
| 2005/0154746 A1 | 7/2005 | Liu et al. | 707/101 |
| 2005/0165781 A1 | 7/2005 | Kraft et al. | 707/7 |
| 2005/0187965 A1 | 8/2005 | Abajian | 707/102 |
| 2005/0192936 A1 | 9/2005 | Meek et al. | 707/3 |
| 2005/0192955 A1 | 9/2005 | Farrell | 707/5 |
| 2005/0240580 A1 | 10/2005 | Zamir et al. | 707/4 |
| 2005/0262050 A1 | 11/2005 | Fagin et al. | 707/3 |
| 2006/0047649 A1 | 3/2006 | Liang | 707/4 |
| 2006/0294509 A1* | 12/2006 | Mital et al. | 717/143 |
| 2007/0038616 A1 | 2/2007 | Guha | 707/4 |
| 2007/0074121 A1* | 3/2007 | Mullender et al. | 715/744 |

FOREIGN PATENT DOCUMENTS

| | | |
|---|---|---|
| EP | 0950961 A3 | 10/1999 |
| EP | 1050830 A2 | 11/2000 |
| EP | 1120717 A2 | 8/2001 |
| JP | 10091638 | 4/1998 |
| JP | 11328191 | 11/1999 |

OTHER PUBLICATIONS

Cho et al., "Efficient Crawling Through URL Ordering", In Proceedings of the 7th International World Wide Web Conference, Apr. 1998, pp. 161-180.

Chakrabarti, S., "Recent Results in Automatic Web Resource Discovery", ACM Computing Surveys, vol. 31, No. 4es, Dec. 1999, pp. 1-7.

Lam et al., "Automatic Document Classification Based on Probabilistic Reasoning: Model and Performance Analysis", IEEE, 1997, pp. 2719-2723.

Lee, J.K.W. et al., "Intelligent Agents for Matching Information Providers and Consumers on the Worl-Wide Web", IEEE, 1997, pp. 189-199.

Huang et al., "Design and Implementation of a Chinese Full-Text Retrieval System Based on Probabilistic Model", IEEE, 1993, pp. 1090-1093.

Yuwono, Budi and Lee, Dik L., "Search and Ranking Algorithms for Locating Resources on the World Wide Web", IEEE, 1996, pp. 164-170.

U.S. Official Action in U.S. Appl. No. 10/981,962 mailed Apr. 5, 2006.

U.S. Official Action in U.S. Appl. No. 10/981,962 mailed Sep. 21, 2006.

U.S. Official Action in U.S. Appl. No. 10/804,326 mailed Oct. 16, 2006.

U.S. Official Action in U.S. Appl. No. 10/955,462 mailed Nov. 3, 2006.

U.S. Official Action in U.S. Appl. No. 10/955,983 mailed Mar. 22, 2007.

U.S. Official Action in U.S. Appl. No. 10/981,962 mailed Apr. 30, 2007.

U.S. Official Action in U.S. Appl. No. 10/955,462 mailed May 11, 2007.

U.S. Official Action in U.S. Appl. No. 11/019,091 mailed Jun. 20, 2007.

U.S. Official Action in U.S. Appl. No. 10/955,462 mailed Sep. 10, 2007.

U.S. Official Action in U.S. Appl. No. 10/955,983 mailed Nov. 13, 2007.

U.S. Official Action in U.S. Appl. No. 10/804,326 mailed Dec. 11, 2007.

U.S. Official Action in U.S. Appl. No. 11/238,906 mailed Jan. 8, 2008.

U.S. Official Action in U.S. Appl. No. 10/981,962 mailed Mar. 17, 2008.

U.S. Official Action in U.S. Appl. No. 11/019,091 mailed Apr. 3, 2008.

EP Search Report in EP 00309121 mailed Jul. 18, 2002.
EP Exam Report in EP 00309121.2-1522 mailed Jul. 4, 2003.
EP Exam Report in EP 00309121.2-1527 mailed Jun. 16, 2004.
EP Search Report in EP 05105048 mailed Jan. 17, 2006.
EP Search Report in EP 05105110 dated Aug. 11, 2006.
EP Exam Report in EP 00309121.2-1527 mailed Feb. 8, 2007.

Office Action mailed Sep. 25, 2009, in Chinese Patent Application No. 200680045521.2, *w/Translation*.
Office Action mailed Apr. 13, 2010, in Chinese Patent Application No. 200680045521.2, *w/Translation*.

Office Action mailed Sep. 21, 2010, in Chinese Patent Application No. 200680045521.2, *w/Translation*.

\* cited by examiner

UI Metadata:       360

```
<xaml:Page Load="PageLoad" Name="My Custom Page" xmlns:xaml="urn-Mendocino/
xaml" Top="0" Left="0" Width="320" Height="400" Assembly="CodeBehind,
Version=1.0.0.0, Culture=neutral, PublicKeyToken=null"
TypeName="CodeBehind.PageCodeBehind">
```

362   `<xaml:Panel Name="panel1" Left="8" Top="8" Width="304" Height="384"`
      `Text="My Panel" Anchor="Top, Bottom, Left, Right">`

364   `<xaml:Label Name="label1" Top="16" Left="8" Width="80"`
        `Text="Label" />`

366   `<xaml:TextBox Name="textBox1" Top="40" Left="8" Width="200"`
        `Text="textbox" Anchor="Top,Left,Right" />`

368   `<xaml:CheckBox Name="checkBox1" Width="140" Top="72" Left="112"`
        `Text="This is a checkbox" IsChecked="true" />`

370   `<xaml:Button Left="8" Width="100" Top="132" Background="Control"`
        `Name="button1" Text="This is a button" Click="ButtonClick" />`

372   `<xaml:LinkLabel Top="132" Left="124" Width="100" Text="This is a`
        `link" Click="ButtonClick"/>`

374   `<xaml:ListBox Left="8" Top="164" Name="listBox1" SelectedIndex="2">`
        `<xaml:ListBoxItem>krishna</xaml:ListBoxItem>`
        `<xaml:ListBoxItem>arvind</xaml:ListBoxItem>`
        `<xaml:ListBoxItem>satish</xaml:ListBoxItem>`
        `<xaml:ListBoxItem>jaggi</xaml:ListBoxItem>`

`</xaml:ListBox>`

`<xaml:RadioButtonList Left="8" Top="264" Width="200" Text="These`
        `are the options" SelectedIndex="1">`
    376   `<xaml:RadioButton>Choose A</xaml:RadioButton>`
        `<xaml:RadioButton>Choose B</xaml:RadioButton>`
        `</xaml:RadioButtonList>`

`</xaml:Panel>`

`</xaml:Page>`

METADATA DRIVEN USER INTERFACE

RELATED APPLICATIONS

This utility patent application claims the benefit under 35 United States Code §119(e) of U.S. Provisional Patent Application No. 60/742,240 filed on Dec. 5, 2005, which is hereby incorporated by reference in its entirety.

BACKGROUND

Some application developers desire to customize their applications to interoperate with certain widely-used existing applications such as: word-processing applications; email applications; and the like. In some instances, the application developer would like to provide a user interface that is customized for an application but that can still be easily modified or extended as the application changes. Today, the application developer hard codes this functionality into the application making it cumbersome to change and update.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Metadata is defined to create customized user interface (UI) portions for an application. The metadata is created according to a metadata schema that defines mechanisms for data binding application data to the controls of the UI. The metadata may be XML-based and is interpreted and then rendered to implement a customized UI that also supports data binding between data and the UI controls. For example, an application developer can write a metadata file that defines basic as well as custom UI controls, properties of the controls, layout of the controls, and the like. Once created, the metadata is processed by a rendering engine to display the UI controls. An interpreter may be used to interpret the metadata file before it sent to the rendering engine. Neither the rendering engine nor the interpreter needs knowledge of the host application and provides support for arbitrary metadata driven UI. The metadata schema may include mechanisms to create custom controls for the UI; programmatically modify the UI controls by providing access to a code-behind assembly as well as support event handling for the UI controls.

BRIEF DESCRIPTION OF THE DRAWINGS

FIGS. 3A and 3B show an example UI form that is described by a metadata file.

DETAILED DESCRIPTION

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
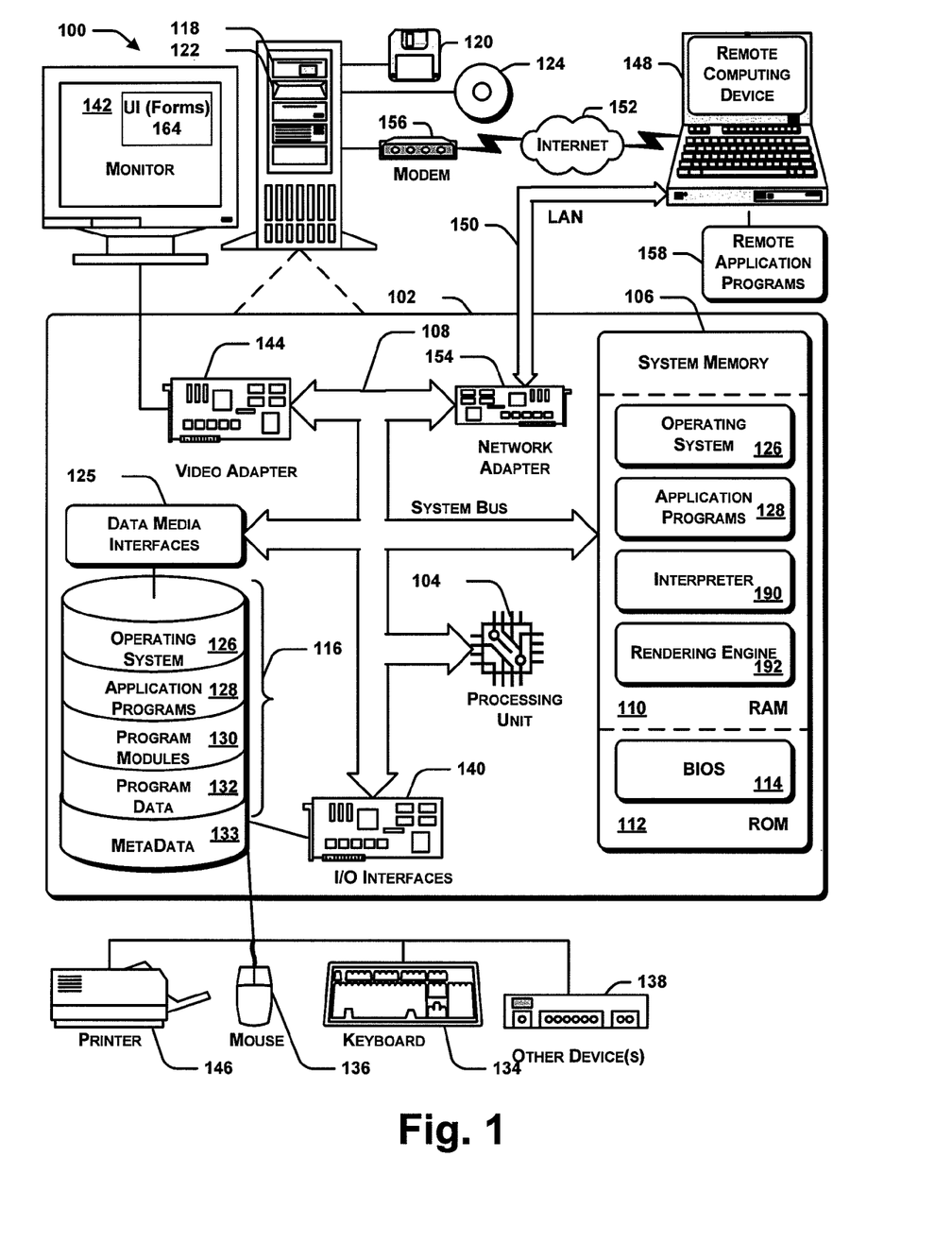
FIG. 1 illustrates an exemplary computing environment.

FIG. 1 illustrates an exemplary computer environment 100, which can be used to implement the techniques described herein. The computer environment 100 is only one example of a computing environment and is not intended to suggest any limitation as to the scope of use or functionality of the computer and network architectures. Neither should the computer environment 100 be interpreted as having any dependency or requirement relating to any one or combination of components illustrated in the example computer environment 100.

Computer environment 100 includes a general-purpose computing device in the form of a computer 102. The components of computer 102 can include, but are not limited to, one or more processors or processing units 104, system memory 106, and system bus 108 that couples various system components including processor 104 to system memory 106.

System bus 108 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 102 may include a variety of computer readable media. Such media can be any available media that is accessible by computer 102 and includes both volatile and non-volatile media, removable and non-removable media.

System memory 106 includes computer readable media in the form of volatile memory, such as random access memory (RAM) 110; and/or non-volatile memory, such as read only memory (ROM) 112 or flash RAM. Basic input/output system (BIOS) 114, containing the basic routines that help to transfer information between elements within computer 102, such as during start-up, is stored in ROM 112 or flash RAM. RAM 110 typically contains data and/or program modules that are immediately accessible to and/or presently operated on by processing unit 104.

Computer 102 may also include other removable/non-removable, volatile/non-volatile computer storage media. By way of example, FIG. 1 illustrates hard disk drive 116 for reading from and writing to a non-removable, non-volatile magnetic media (not shown), magnetic disk drive 118 for reading from and writing to removable, non-volatile magnetic disk 120 (e.g., a "floppy disk"), and optical disk drive 122 for reading from and/or writing to a removable, non-volatile optical disk 124 such as a CD-ROM, DVD-ROM, or other optical media. Hard disk drive 116, magnetic disk drive 118, and optical disk drive 122 are each connected to system bus 108 by one or more data media interfaces 125. Alternatively, hard disk drive 116, magnetic disk drive 118, and optical disk drive 122 can be connected to the system bus 108 by one or more interfaces (not shown).

The disk drives and their associated computer-readable media provide non-volatile storage of computer readable instructions, data structures, program modules, and other data for computer 102. Although the example illustrates a hard disk 116, removable magnetic disk 120, and removable optical disk 124, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 116, magnetic disk 120, optical disk 124, ROM 112, and/or RAM 110, including by way of example, operating system 126 (which in some embodiments include low and high priority I/O file systems and indexing systems described above), one or more application programs 128, interpreter 192, and rendering engine 192. Each of such operating system 126, one or more application programs 128, a metadata interpreter 190, a UI rendering engine 192 and metadata 133 (or some combination thereof) may implement all or part of the resident components. The metadata repository 133 includes information that allows the customization of UI elements on a UI that is associated with application programs 128. For example, the metadata can include information that allows the customization of UI forms for UI 164 that is displayed on monitor 142. The metadata repository 133 may include information for multiple applications on various coupled computing devices.

A user can enter commands and information into computer 102 via input devices such as keyboard 134 and a pointing device 136 (e.g., a "mouse"). Other input devices 138 (not shown specifically) may include a microphone, joystick, game pad, satellite dish, serial port, scanner, and/or the like. These and other input devices are connected to processing unit 104 via input/output interfaces 140 that are coupled to system bus 108, but may be connected by other interface and bus structures, such as a parallel port, game port, or a universal serial bus (USB).

Monitor 142 or other type of display device can also be connected to the system bus 108 via an interface, such as video adapter 144. In addition to monitor 142, other output peripheral devices can include components such as speakers (not shown) and printer 146 which can be connected to computer 102 via I/O interfaces 140.

Computer 102 can operate in a networked environment using logical connections to one or more remote computers, such as remote computing device 148. By way of example, remote computing device 148 can be a PC, portable computer, a server, a router, a network computer, a peer device or other common network node, and the like. Remote computing device 148 is illustrated as a portable computer that can include many or all of the elements and features described herein relative to computer 102.

Logical connections between computer 102 and remote computer 148 are depicted as a local area network (LAN) 150 and a general wide area network (WAN) 152. Such networking environments are commonplace in offices, enterprise-wide computer networks, intranets, and the Internet.

When implemented in a LAN networking environment, computer 102 is connected to local network 150 via network interface or adapter 154. When implemented in a WAN networking environment, computer 102 typically includes modem 156 or other means for establishing communications over wide network 152. Modem 156, which can be internal or external to computer 102, can be connected to system bus 108 via I/O interfaces 140 or other appropriate mechanisms. The illustrated network connections are examples and that other means of establishing at least one communication link between computers 102 and 148 can be employed.

In a networked environment, such as that illustrated with computing environment 100, program modules depicted relative to computer 102, or portions thereof, may be stored in a remote memory storage device. By way of example, remote application programs 158 reside on a memory device of remote computer 148. For purposes of illustration, applications or programs and other executable program components such as the operating system are illustrated herein as discrete blocks, although it is recognized that such programs and components reside at various times in different storage components of computing device 102, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Figure 2:
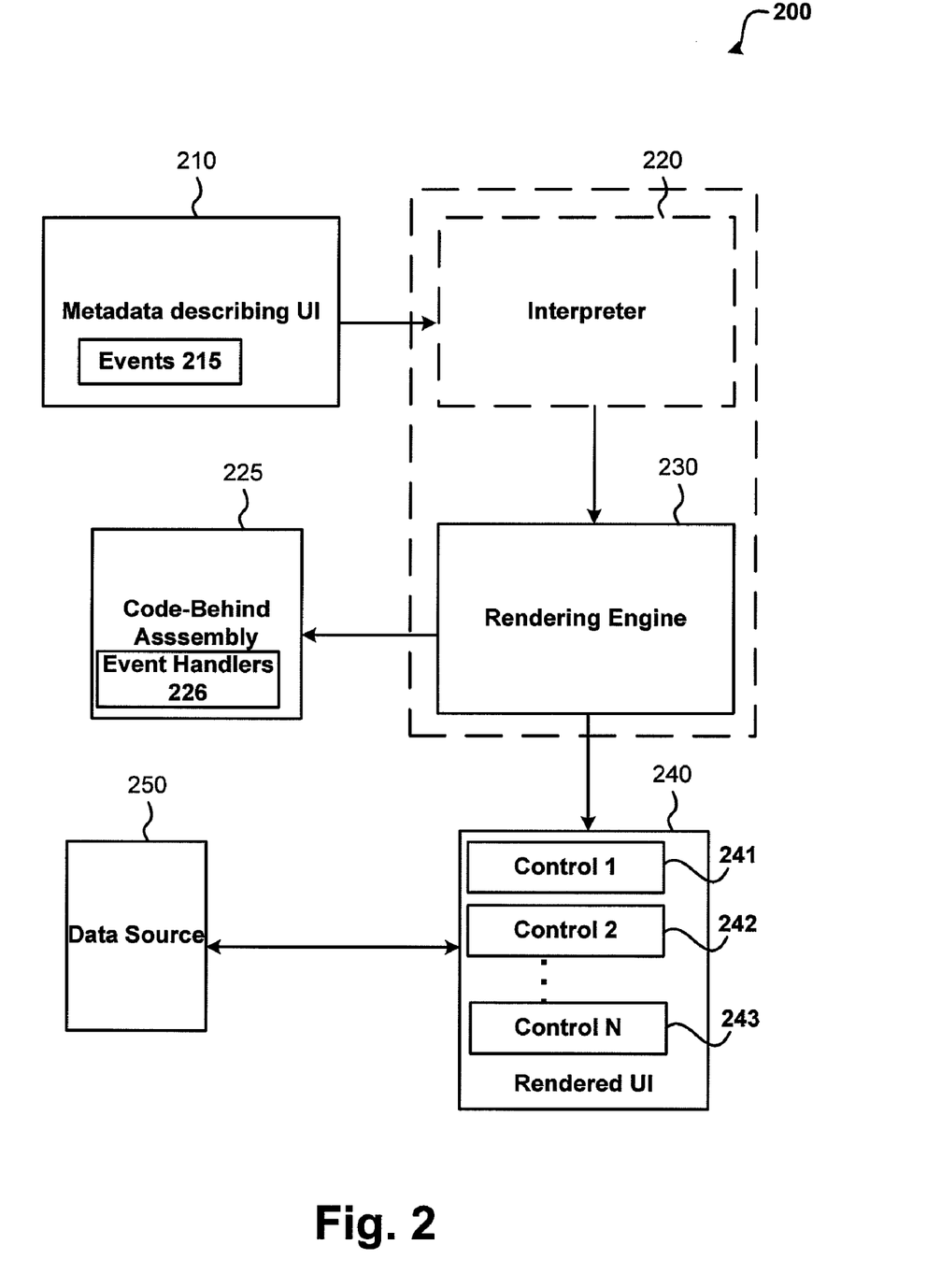
FIG. 2 shows a user interface metadata system.

FIG. 2 shows a user interface metadata system. As illustrated, system 200 includes metadata 210, interpreter 220, code-behind assembly 225, rendering engine 230 that renders user interface 240 and back-end data source 250. Initially, a developer, or some other user, specifies metadata 210 for a given UT Form. Generally, once the metadata has been created and specified, the interpreter 220 accesses the metadata and then passes the UI information to rendering engine 230 such that the UI 240 may be displayed to a user. Although interpreter 220 is illustrated separately from rendering engine 230 its functionality may be included within rendering engine 230 as illustrated by the dashed box surrounding the interpreter 220 and rendering engine 230.

Metadata 210 allows the developer to specify a set of events 215 for each control 241-243 that are included on the user interface 240. The metadata 210 allows the UI forms developer to specify the controls to be added to the UI; define custom events on these added controls (or add events to the existing controls); and define the event-handlers via code in a code-behind assembly 225 for these new custom events (or modify existing custom-handlers by overriding the default behavior). An Object Model (OM) is exposed that allows the developer to read/modify properties of the controls on the form such that the event-handlers are defined in the code behind assembly 225. The name and location of the code-behind assembly 225 is captured as part of the metadata 210.

According to one embodiment, the events mirror the typical events supported for the same type of control in a WIN-FORMS environment. In addition to the standard events that may be initially supported by a control, additional controls and custom events may be added through the metadata 210.

As illustrated, the rendering engine 230 receives the metadata defining the UI through interpreter 220 and renders the UI form 240. According to one embodiment, rendering engine 230 renders the UT form either in an IBF task pane or a MICROSOFT OUTLOOK custom form. According to this embodiment, the rendering engine 230 creates a .NET control object correpsonding to the UT that is defined by the metadata 210 and that .NET control is hosted either in the IBF task pane or OUTLOOK custom form. In this embodiment, the rendering engine 230 parses the metadata that is supplied by interpreter 220 and instantiates the different controls (i.e. 241-243) that are described by metadata 210 and outputs a .NET control describing the UI form.

According to one embodiment, the rendering engine 230 provides ten basic controls which the UI forms developer can use while designing a UI form using metadata These ten basic controls include: Panel; Label; LinkLabel; TextBox; Button; ListBox; ComboBox; RadioButton; CheckBox and an Image control. As discussed previously, custom control and events may also be created. Other basic controls may also be provided.

Each control includes a wrapper class which wraps the control (i.e. a native WINFORM (.NET) control). The wrapper provides functionality for data binding and exposing control properties to the code behind assembly 225 through a programmatic object model (OM). The following is an exemplary wrapper class for a textbox control:

```
internal class XamlTextBox : XamlControl, IXamlTextBox
{
    // Native winform (.NET) control
    private TextBox textBox = null;
    ---
}
```

The 'IXamlTextBox' interface exposes TextBox specific properties to the code behind file. An application developer can access a textbox control on the UI in the code behind using the 'IXamlTextBox' interface and read/write the control properties.

The 'XamlControl' provides the base class for the controls rendered by the rendering engine 230.

```
internal class XamlControl : IXamlControl, IBindable
{
    // Native winform (.NET) control
    protected Control Control = null;
}
```

The 'IXamlControl' interface exposes the control to the code behind file. An application developer can access properties of a control through this interface in the code behind assembly 225. The 'IBindable' interface is used by the 'Binder' component to set control properties which are bound to properties in a data source. The 'XamlControl' class receives the pseudo XAML metadata (XML) defining the control and then it instantiates the native .NET WINFORM control (depending upon type) and sets the control properties specified in the metadata for the control.

```
public XamlControl(XmlNode nodeXml, IControlParent parent, string type)
{
    this.Control = CreateControl(type);
    ...
}
```

When the rendering engine 230 receives the pseudo XAML metadata defining a UI form it reads/parses the input XML and instantiates the wrapper classes for the controls passing in the metadata defining the control. According to one embodiment, the parsing is done in a depth first manner. Other methods may also be used. The wrapper class instantiates the native WINFORM (.NET) control and sets the control properties as defined in the metadata. A wrapper class for each control sets the control properties as specified in the metadata. The base 'XamlControl' class sets the properties which are common to every control (for e.g. Background, Foreground, Anchor, Font etc). The specific derived classes such as: 'XamlTextBox' handles the control (textbox) specific properties. If a particular control property is bound to a property in a data source, such as data source 250, then the wrapper class passes the control, property name and binding expression to the 'Binder,' which then gets the property value from the data source and then sets the specific control property through the 'IBindable' interface. The wrapper class for each control also subscribes to the control events (SubscribeToEvents()) exposed by the pseudo XAML metadata. When an event on a control fires then the rendering engine 230 forwards the event to the event handler defined in the code behind assembly 225. The wrapper class also calls a 'GetChildControls()' method which instantiates the child controls for the control.

Event handlers 226 may be developed for control events occurring on the form. To handle a specific event on a control, the developer performs steps, including: developing a code behind assembly 225 which contains the event handler code; specifying the code behind assembly in the metadata; and specifying the event handler (method) name which handles a particular event for a control. According to one embodiment, to specify an event handler in the metadata for an event on a control the developer supplies the event handler method name present in the code behind assembly as the value of the attribute corresponding to the event on the control. The metadata 210 specifies that the "Click" event for the Button control is handled by the method "ButtonClick" which is present as a public method in the code behind assembly. According to one embodiment, the signature for the event handler is same as what it would be for that event on that particular control in case of .NET WINFORMS environment. For example, the event handler for the click event on a Button would have the following signature: public void ButtonClick(object sender, System.EventArgs e) { }. According to one embodiment, this is the same signature as the original button control which provides for programmer understanding and consistency.

Rendering engine 230 loads the code behind assembly 225 when it parses the metadata 210 provided by interpreter 220 and instantiates the code behind class through reflection. The events that are exposed through the metadata on a control are subscribed to when that control is instantiated during parsing of the metadata. In one implementation the event handlers for control events bubble up the event to the "Page" level and then the event handler in the code behind assembly is called through reflection. More than one "code behind" assembly can be associated to a "page" or form. Providing more than one "code behind" assembly allows for multiple levels (multiple parties) of extensibility.

Data may also be bound to one or more of the controls (e.g. controls 241-243) from a backend data source 250. According to one embodiment, the binding expressions that bind data source 250 to one or more of the controls (e.g controls 241-243) are specified in the metadata. Each property of a control (i.e. controls 241-243) can be bound to data coming from a data source. Thus, the data source changes control properties that are associated with the controls when the data source 250 is changed. More than one data source may be bound. For example, control 1 (241) could be bound to one data source while control 2 (242) is bound to a different data source. According to one embodiment, there are two different types of data sources, including an object data source and an XML data source. An object data source is a .NET class residing in a .NET assembly which acts as a data source for controls on the UI. An XML Data Source acts as a source of XML data which is specified inline in the XAML metadata defining the UI.

According to one embodiment, an object data source can be specified in the metadata in the following manner: <xaml:ObjectDataSource Name="myDataSource" TypeName="DataSourceNamespace.DataSourceClass, DataSourceAssembly"/>The "DataSourceClass" implements the "IBindData" and "INotifyPropertyChanged" interfaces. Exemplary embodiments of these interfaces are described below:

```
public interface IBindData
{
    object GetData(string path); // gather data
    bool SetData(string path, object val); // scatter data
}
```

In this embodiment, the "IBindData" interface allows to bind data between the data source and control properties (explained below) through the standard .NET event delegate model.

```
public interface INotifyPropertyChanged
{
    event PropertyChangedEventHandler PropertyChanged;
}
    public delegate void PropertyChangedEventHandler(object sender, PropertyChangedEventArgs e);
    public class PropertyChangedEventArgs : System.EventArgs
    {
        public virtual string PropertyName {get; }
    }
```

The "INotifyPropertyChanged" interface allows the data source to signal any changes that happen on the data source so that the UI properties which are bound to that data source can be updated. The data source raises the "PropertyChanged" event whenever a property in the data source changes. The relevant properties on the UI are then updated whenever this event fires. Once the data sources are specified in the metadata then any property of a control can be bound to data coming from a data source.

To specify a binding for a control property the developer supplies a binding expression as the value of the attribute corresponding to that property. For example, to bind the "Text" property of a text box, the developer can specify a binding expression in the metadata 210 as follows: <xaml:TextBox Name="textBox1" Top="40" Left="8" Width="200"Text="{Binding Source=DataSourceName, Path=CustomerName, Mode=TwoWay}" Anchor="Top, Left,Right"/>The expression Text="{Binding Source=DataSourceName, Path=CustomerName, Mode=TwoWay}" is a binding expression for the 'Text' property. The 'Source' clause refers to a data source defined in the metadata. This could be an Object data Source or XML Data Source. In case of Object Data Source the value of the 'Path' clause is passed to the data source's "GetData(string path)" method when retrieving the value for the bound property. For an XML Data source the 'Path' clause is an Xpath expression in this embodiment, which selects a particular node/attribute in the XML data whose value would be the bound to the control property. The 'Mode' clause indicates 'OneWay' or 'TwoWay' binding. If the data flows from the data source to controls on the UI then the binding is 'OneWay' but if UI property changes are also propagated back to the data source then the binding is 'TwoWay'. The 'UpdateSourceTrigger' is an enumeration which specifies when (what event) to signal the data source that a UI property has changed and the changed property value needs to be propagated to the data source. By default, in this embodiment, the value for this clause is 'PropertyChanged' which means that when a bound property changes then it is signaled to the data source. According to one embodiment, this only takes effect in case of 'TwoWay' binding.

The 'ItemsSource' attribute of a List Control allows binding of the items in the list to a collection of objects coming from a data source. When the 'ItemsSource' property is bound then the data source returns a .NET collection implementing the 'System.Collections.IEnumerable' interface. The 'DisplayMemberPath' attribute of the List Control specfies the property of the .NET object(s) which form the collection whose value is used as the display text for the item in the list control. If the 'DisplayMemberPath' is null then the default 'ToString()' method is called on the .NET object and the string returned is used as the display text. For example, suppose the data source returns a collection of 'Customer' objects which are shown in the list control then the 'Customer' object may have a 'Name' property whose value is to be used as the display text in the list control. In this case the 'DisplayMemberPath' is set to 'Name.' Similarly 'SelectedValuePath' is set to the property of the .NET object(s) forming the collection whose value is returned by the 'SelectedValue' property of the list control when a particular item is selected in the list control. For example, suppose that the 'Customer' object has a 'CustomerID' property whose value is returned by the 'SelectedValue' property when the 'SelectedValuePath' property of the list control is set to 'CustomerID.' If no 'SelectedValuePath' attribute is provided then the whole object ('Customer' object) is returned by the 'SelectedValue' property of the list control.

In case of a XML Data Source, the binding expression for 'ItemsSource' attribute of a list control returns a list of XML nodes. For example, assume that the following is an XML data source:

```
<XmlDataSource Name="BookData">
    <Books xmlns="">
        <Book ISBN="0-7356-0562-9" Stock="in">
            <Title>XML in Action</Title>
            <Summary>XML Web Technology</Summary>
        </Book>
        <Book ISBN="0-7356-1370-2" Stock="in">
            <Title>Programming Microsoft Windows With C#</Title>
        <Summary>C# Programming using the .NET Framework
        </Summary>
        </Book>
        <Book ISBN="0-7356-1288-9" Stock="out">
            <Title>Inside C#</Title>
            <Summary>C# Language Programming</Summary>
        </Book>
        <Book ISBN="0-7356-1377-X" Stock="in">
            <Title>Introducing Microsoft .NET</Title>
            <Summary>Overview of .NET Technology</Summary>
        </Book>
        <Book ISBN="0-7356-1448-2" Stock="out">
            <Title>Microsoft C# Language Specifications</Title>
            <Summary>The C# language definition</Summary>
        </Book>
    </Books>
</XmlDataSource>
```

The binding expression for the 'ItemsSource' property of a list which shows the list of books is: <ListBox ItemsSource="{Binding Source=BookData, Path=/Books/Book}"/> The 'Path' clause in the above binding expression is actually an Xpath expression which returns a list of nodes which are populated in the list control from the XML Data Source. The 'DisplayMemberPath' attribute of the list control should be an Xpath (in case of XmlDataSource) which selects the node/attribute whose value is to be used as the display text in the list control. For example, if the UI forms developer wants to display the 'Title' for each book in the list control, then the user's XML would look like: <ListBox ItemsSource="{Binding Source=BookData, Path=/Books/Book}" DisplayMemberPath="Title"/> Similarly, the 'SelectedValuePath' attribute of the list control points to the node/attribute of the list item whose value is returned by the 'SelectedValue' attribute of the list.

For example, suppose that the UI forms developer wants to return the 'ISBN' value for a book in the 'SelectedValue' property of the list control when a particular book is selected in the list, then the 'SelectedValuePath' attribute may be an Xpath pointing to the 'ISBN' attribute of the book item.

<ListBox ItemsSource="{Binding Source=BookData, Path=/Books/Book}" DisplayMemberPath="Title" SelectedValuePath="@ISBN"/>

Controls utilizing data binding implement the 'IBindable' interface as illustrated below:

```
public interface IBindable
{
    object GetBoundValue(string propName);
    void SetBoundValue(string propName, object val);
}
```

When the UI form 240 is initially rendered then for every bound property the 'GetData(string path)' method of the relevant data source (specified in the binding expression) is called passing in the value of the 'Path' clause in the binding expression as an argument. This method returns a value of type 'object.' Next, the 'SetBoundValue(string propName, object value)' is called on the control whose property is bound passing in the name of the bound property and the 'value' returned by the data source. The control has the responsibility for understanding the 'value' object and interpreting it to update the bound property. Besides the initial rendering of the UI form whenever the data source changes the data source signals the binder of a change in data source (INotifyPropertyChanged). The binder finds out which control properties are bound to the changed data source and updates those properties. In the case of 'TwoWay' binding then whenever a bound UI property changes on the UI form then the binder is notified and the binder then propagates the changed property value back to the data source.

As discussed briefly above, the rendering engine 230 also provides a generic framework for hosting custom built controls. According to one embodiment, the framework supports custom .NET winform controls. According to one embodiment, any custom controls derive from the class: 'System.Windows.Forms.UserControl.' Each custom control has a default contructor and also implements the ICustomControl interface and the 'IBindable' interface so that it can participate in data binding. The following is an exemplary 'ICustomControl' interface:

```
public interface ICustomControl
{
    void SetControlProperty(string propName, string propValue);
    event ControlEventFiredHandler ControlEventFired;
}
public delegate void ControlEventFiredHandler(object sender,
ControlEventFiredArgs e);
public class ControlEventFiredArgs : System.EventArgs
{
    public string EventName {get;}
    public object Sender { get; }
    public object EventArgs {get;}
}
```

The 'SetControlProperty(string propName, string propValue)' method is used by the rendering engine 230 to set custom properties for the control. For each custom property which the custom control exposes and which is not included in the basic properties of a control (e.g. Width, Height, Top, Left etc) the rendering engine 230 calls the 'SetControlProperty' method on the custom control and it is up to the custom control to understand and interpret the 'string' property value that is specified in the metadata which would be passed to the 'SetControlProperty' method.

The 'ControlEventFired' event is raised by the custom control when a custom event exposed by the control fires. This is to signal the rendering engine 230 that an event has fired on the custom control and the rendering engine needs to call the event handler (if any) for that event in the code behind assembly 225. The rendering engine does not know at compile time what are the events (and event signatures) supported by the custom control. As such, the rendering engine 230 requires the custom control to notify it when a custom event fires on the custom control. The custom control creates an instance of the 'ControlEventFiredArgs' class and passes it to the 'ControlEventFired' event which is received by the rendering engine 230. The 'ControlEventFiredArgs' contains information about the name of the event which fired, sender and event arguments which need to be passed to the event handler for that event. Once the rendering engine 230 has this information it can call the event handler for that event specified in the code behind assembly 225.

According to one embodiment, the custom controls reside in a .NET assembly at run time. The custom control assembly in the metadata may be specified in the following way: <xaml:Mapping XmlNamespace="urn-Mendocino/CustomControls" ClrNamespace="CustomControlNamespace" Assembly="CustomControlAssembly, Version=1.0.0.0, Culture=neutral, PublicKeyToken=null"/> The 'Mapping' element is a processing directive rather than an XML element. Other ways of specifying the custom control assembly may also be utilized.

A custom control can be specified in the metadata through the following exemplary metadata: <custom:CustomControl xmlns:custom="urn-Mendocino/CustomControls" Top="0" Left="0" Height="100" Width="100" . . . /> In this embodiment, the rendering engine 230 instantiates the custom control through reflection and first set the basic properties of a control like Height, Width, Top, Left, and the like and then for other properties (custom properties) the rendering engine 230 calls the 'SetControlProperty()' method on the custom control.

A mechanism within the metadata schema allows the UI forms developer to access the UI controls and their properties in the code behind assembly. The code behind class implements the 'IPageCodeBehind' interface which is described below:

```
public interface IPageCodeBehind
{
    string Name { get; set; }
    IPageControlCollection PageControls { get; set; }
    object Application { get; set; }
    object Mediator {get; set; }
    object ReturnValue { get; set; }
}
```

The 'PageControls' property is populated by the rendering engine 230 when it renders the UI form and instantiates the controls. The 'Application' property represents the host application (i.e. OUTLOOK) in which the UI forms are being rendered. According to one embodiment, the 'Mediator' property allows the code behind developer to execute IBF actions defined in metadata. 'ReturnValue' is a variable which can be set by the code behind developer which is passed back to the caller who renders the form. This is used in case of modal dialogs to pass back a value from the dialog to the caller.

The following is an exemplary 'IPageControlCollection' interface:

```
public interface IPageControlCollection : ICollection, IEnumerable
{
    IXamlControl this[string name] { get; }
}
```

The 'IXamlControl' interface exposes the properties for a control on the form.

```
public interface IXamlControl
{
    // Properties...
    string Name { get;set; }
    int Top { get;set; }
    int Left { get;set; }
    Color Background { get;set; }
    bool IsEnabled { get;set; }
    int Height { get;set; }
    int Width { get;set; }
    // Other properties //...
}
```

This allows the UI forms developer to access a control on the form in the following way: MessageBox.Show(this.PageControls["myButton"].Text); The 'IXamiControl' interface exposes the basic properties of a control that are common to every control. To access specific properties for a control (e.g. IsChecked for a CheckBox control) the developer can cast the 'IXamlControl' object to the specific control interface, such as: 'IXamlCheckBox', 'IXamlTextBox', and the like. ((IXamlCheckBox)this.PageControls["myCheckBox"]).IsChecked The following is an exemplary 'IXamlCheckBox' interface that derives from the 'IXamlControl' interface:

```
public interface IXamlCheckBox : IXamlControl
{
    // CheckBox specific properties...
    ContentAlignment TextAlignment    {get; set;}
    bool IsChecked              {get; set;}
}
```

Similarly specific interfaces for the controls are exposed which allow the UI forms developer to access control specific properties.

According to one embodiment, the rendering engine 230 generates the same .NET control from the metadata describing the UI form irrespective of whether the UI form is hosted in an IBF task pane, an OUTLOOK custom form or a dialog. The following scenarios provide example of how the .NET control may be hosted.

According to one embodiment, the IBF task pane supports hosting any .NET control which implements the 'IRegion' interface. The rendering framework contains a blank (empty) .NET control which implements the 'IRegion' interface and which hosts the .NET control generated by the UI rendering engine from the UI metadata. To display a metadata defined UI form in the IBF task pane the 'MSIBF.UI.ShowRegion' custom operation is used which displays the blank .NET host control part of the UI rendering framework. The input passed to this 'MSIBF.UI.ShowRegion' operation is the IBF metadata defining the UI form which is to be hosted in the IBF task pane. The MSIBF.UI.ShowRegion' operation instantiates the blank host .NET control and passes the metadata defining the UI form as 'Data' to the blank host .NET control. The host control calls the rendering engine 230 passing in the metadata defining the UI form and which returns a .NET control describing the UI form and which is then added to the host control resulting in the display of the UI form in the IBF task pane.

According to another embodiment, to host a .NET control describing a UI form in an OUTLOOK an ActiveX container control capable of hosting .NET controls is added to the OUTLOOK form and then the .NET control is added describing the UI form as a child control of the container control. The ActiveX container control is a part of the UI Rendering framework. According to one embodiment, Forms 2.0 hosts the ActiveX containter which hosts the .NET WinForms control described by metadata.

Metadata defined forms may also be created in modal .NET Winform dialogs. In this embodiment, program code, such as that contained within an addin calls the rendering engine 230 passing in the XAML metadata defining a form and the rendering engine 230 passes back the .NET control generated from the XAML metadata which can then be hosted either in the IBF task pane, OUTLOOK Custom Form or a dialog. The addin instantiates an instance of the 'RenderEngine' class which implements the 'IRenderEngine' interface:

```
public interface IRenderEngine
{
    IXamlPage CreateXamlForm(XmlNode pageXml);
}
```

The caller can call the 'CreateXamlForm' method passing in the XAML metadata describing the form. The rendering engine 230 instantiates the necessary controls and pass back an object ('IXamlPage') which represents the 'xaml' form.

```
public interface IXamlPage
{
    string Name { get; }
    Control NativeControl { get; }
    IPageControlCollection Controls { get; }
    object ReturnValue { get; }
}
```

In this embodiment, the 'NativeControl' property above represents the .NET control describing the metadata UI form which can be hosted either in the IBF task pane, OUTLOOK custom form or a dialog. The 'ReturnValue' property is a variable which can be set from the code behind file and would be used to return a value from a modal dialog.

Figure 3A:
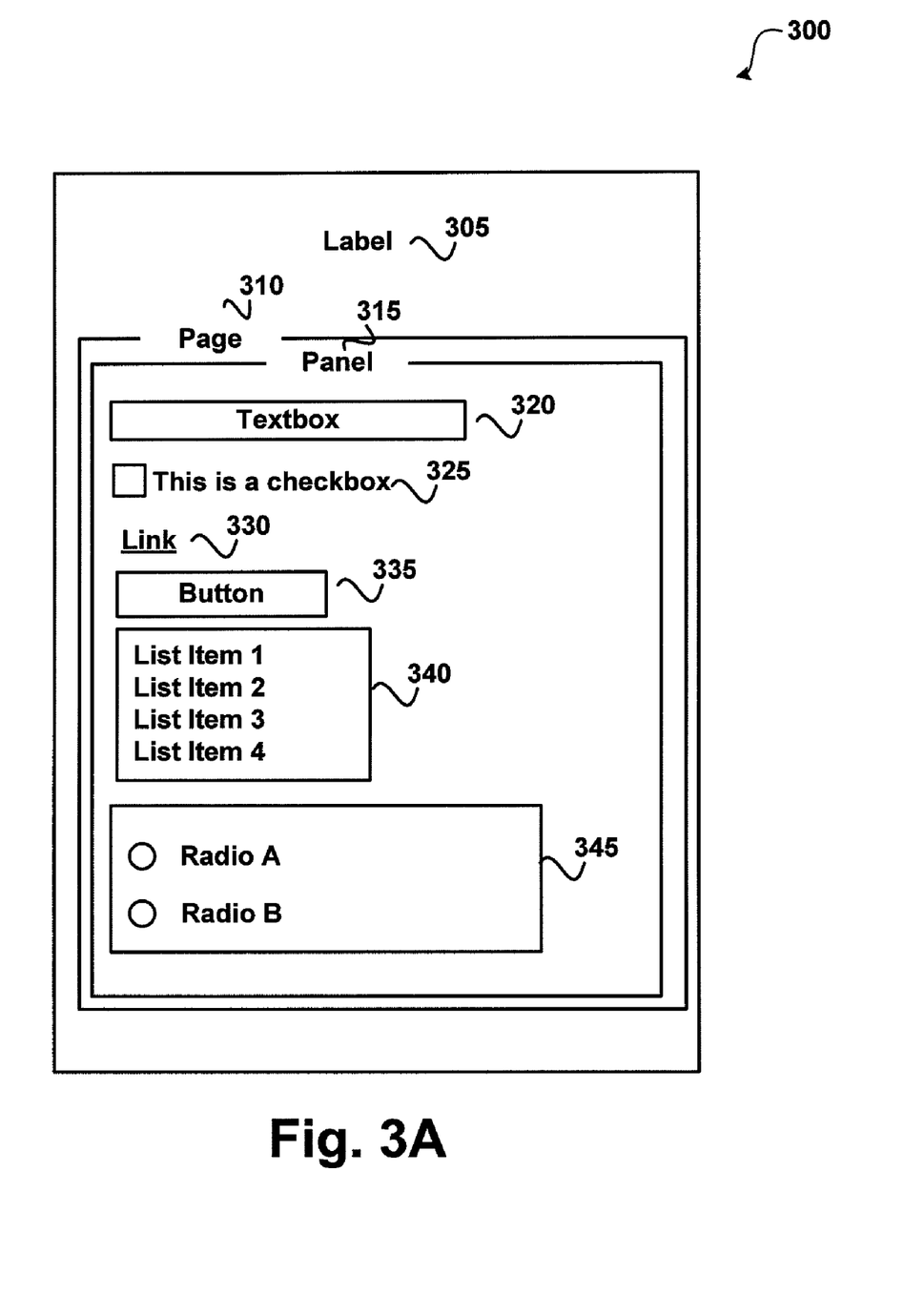

FIGS. 3A and 3B show an example UI form that is described by a metadata file. Referring to FIG. 3A, UI form 300 includes label 305, page 310, panel 315, text box 320, check box 325, link 330, button 335, list box 340 and radio button list 345.

FIG. 3B shows an exemplary UI metadata file 360 that may be used to define the UI form 300 as illustrated in FIG. 3A. The example UI metadata file 360 illustrates that the properties of a control are specified by the attributes of the corresponding XML node. According to one embodiment, most properties have a default value and do not need to be specifically specified. As illustrated in FIG. 3B, indicator 362 shows the description of the panel 310; indicator 364 shows the description of the label 305; indicator 366 shows the description of textbox 320; indicator 368 shows the description of checkbox 325; indicator 370 shows the description of button 335; indicator 372 shows the description of link 330; indicator 374 shows the description of the list box 340 and indicator 376 shows the description of the radio button list 345.

Figure 4:
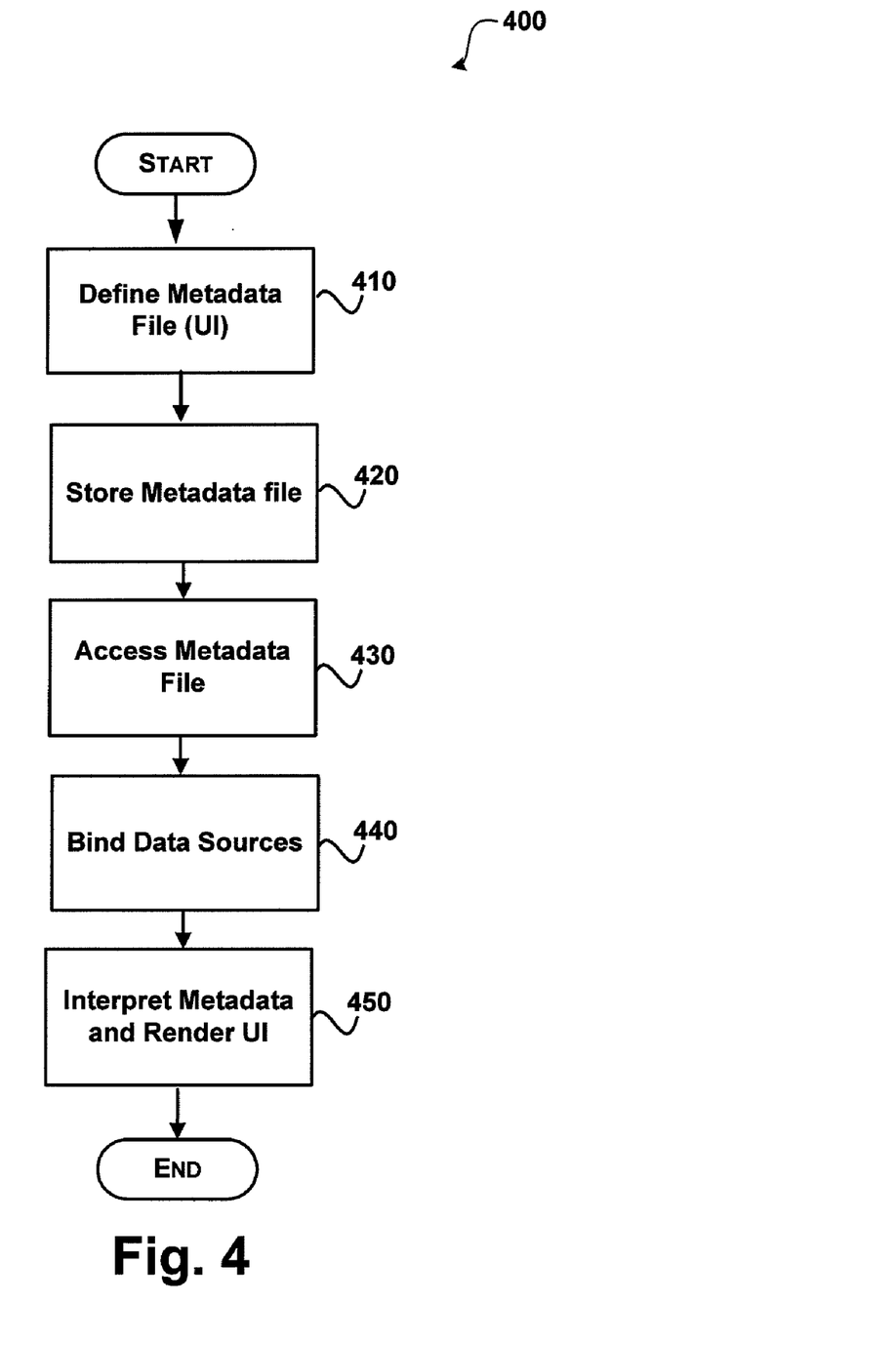
FIG. 4 illustrates a process for using metadata to describe a UI form.

FIG. 4 illustrates a process for using metadata to describe a UI form. After a start operation, the process moves to operation 410 where the metadata file is defined. As discussed above, the metadata within the file describes the UI and includes information on the controls, the data binding, and other relevant information relating to the user interface.

Moving to operation 420, the metadata file is stored. According to one embodiment, the metadata file is stored on a computer-readable medium, such as a hard drive. The metadata file may be stored locally and/or remotely from the computing device displaying the related UI.

Transitioning to operation 430, the metadata file is accessed. According to one embodiment, the metadata file is accessed by a rendering engine. Alternatively, as discussed above, an interpreter may be used to access the metadata file.

Flowing to operation 440, zero or more data sources may be bound to one or more of the controls defined for the UI through the metadata.

Moving to operation 450, the metadata is interpreted and then rendered to display the UI. Each control of the UI form is rendered on the UI (see FIG. 5 and related discussion).

The process then moves to an end operation and returns to processing other actions.

Figure 5:
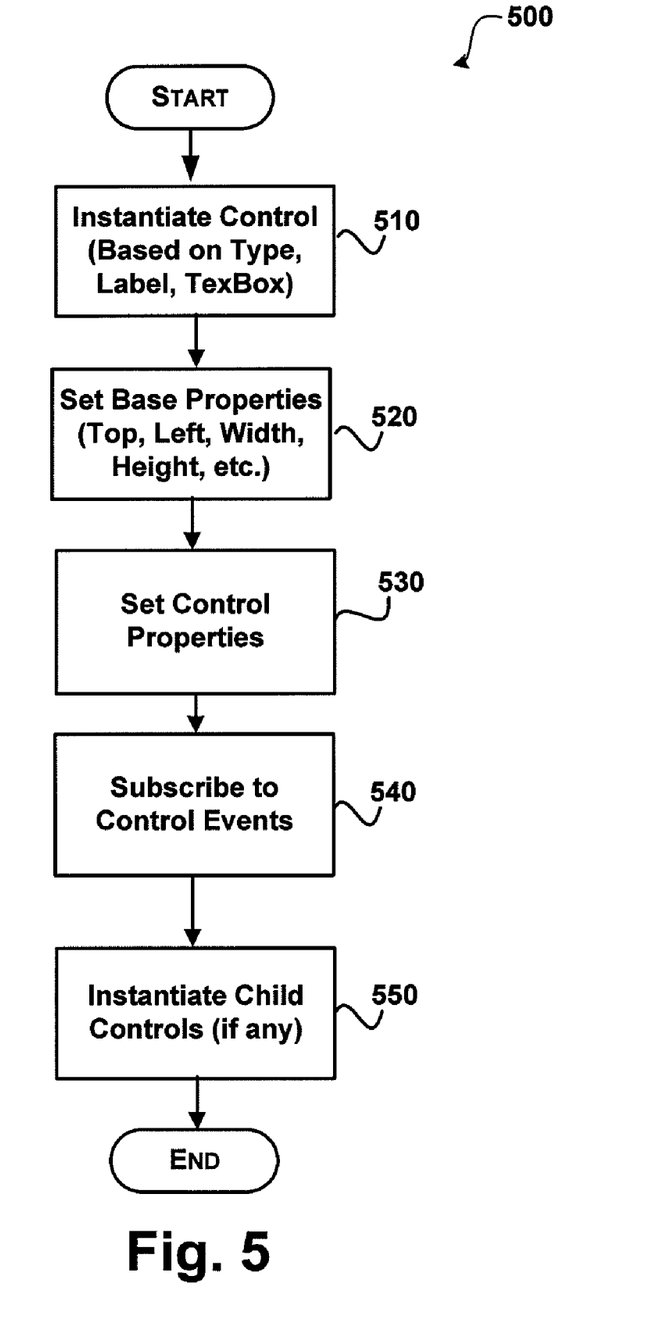
FIG. 5 show a process for rendering a UI form with associated metadata.

FIG. 5 show a process for rendering a UI form with associated metadata. After a start operation, the process moves to operation 510 where a control is instantiated. The control is instantiated based on the type of control (i.e. label, text box, and the like).

Flowing to operation 520, the base properties of the control are set. For example, the properties such as the top, left, height, width, and the like are set.

Moving to operation 530 the control properties are set. The control properties that are set depend on the type of control.

Next, at operation 540, the control events that are specified within the metadata are subscribed to. Flowing to operation 550 any child controls for the control are instantiated. The process then moves to an end operation and returns to processing other actions.

The following is an exemplary schema which may be used for defining a UI form using metadata.

```
<?xml version="1.0" encoding="utf-8" ?>
<xs:schema targetNamespace="urn-Mendocino/xaml"
    elementFormDefault="qualified"
    xmlns:xaml="urn-Mendocino/xaml"
    xmlns:xs="http://www.w3.org/2001/XMLSchema">
    <xs:complexType name="ControlType">
        <xs:attributeGroup ref="xaml:ControlTypeAttributes" />
    </xs:complexType>
    <xs:complexType name="ParentControlType">
```

```
                <xs:complexContent>
                    <xs:extension base="xaml:ControlType">
                        <xs:sequence>
    <xs:element ref="xaml:Control" minOccurs="0" maxOccurs="unbounded"/>
                        </xs:sequence>
                    </xs:extension>
                </xs:complexContent>
        </xs:complexType>
    <xs:complexType name="PageType">
            <xs:complexContent>
                <xs:extension base="xaml:ParentControlType">
                    <xs:sequence>
                        <xs:element ref="xaml:ObjectDataSource"
                minOccurs="0" maxOccurs="unbounded" />
                        <xs:element ref="xaml:XmlDataSource"
                minOccurs="0" maxOccurs="unbounded" />
                    </xs:sequence>
            <!-- Events -->
            <xs:attribute name="Load" type="xs:string" use="optional" />
            <!-- Code Behind Assembly -->
            <xs:attribute name="Assembly" type="xs:string" use="optional" />
            <xs:attribute name="TypeName" type="xs:string" use="optional" />
                </xs:extension>
            </xs:complexContent>
        </xs:complexType>
<xs:complexType name="ObjectDataSourceType">
        <xs:attribute name="Name" type="xs:string" use="required" />
        <!-- Data source class -->
        <xs:attribute name="TypeName" type="xs:string" use="optional" />
        <xs:attribute name="Parameters" type="xs:string" use="optional" />
</xs:complexType>
        <!-- Inline XML data source-->
        <xs:complexType name="XmlDataSourceType">
            <xs:sequence>
                <xs:any processContents="skip" />
            </xs:sequence>
            <xs:attribute name="Name" type="xs:string" use="required" />
        </xs:complexType>
<xs:complexType name="PanelType">
        <xs:complexContent>
            <xs:extension base="xaml:ParentControlType">
            </xs:extension>
        </xs:complexContent>
</xs:complexType>
<xs:complexType name="LabelType">
        <xs:complexContent>
            <xs:extension base="xaml:ControlType">
            <xs:attribute name="TextAlignment" type="xs:string" use="optional" />
            </xs:extension>
        </xs:complexContent>
</xs:complexType>
<xs:complexType name="TextBoxType">
        <xs:complexContent>
            <xs:extension base="xaml:ControlType">
    <xs:attribute name="TextAlignment" type="xs:string" use="optional" />
    <xs:attribute name="MaxLength" type="xs:string" use="optional" />
    <xs:attribute name="MinLines" type="xs:string" use="optional" />
    <xs:attribute name="Wrap" type="xs:string" use="optional" />
            </xs:extension>
        </xs:complexContent>
</xs:complexType>
<xs:complexType name="ButtonType">
        <xs:complexContent>
            <xs:extension base="xaml:ControlType">
    <xs:attribute name="TextAlignment" type="xs:string" use="optional" />
            </xs:extension>
        </xs:complexContent>
</xs:complexType>
<xs:complexType name="LinkLabelType">
        <xs:complexContent>
            <xs:extension base="xaml:ControlType">
    <xs:attribute name="TextAlignment" type="xs:string" use="optional" />
    <xs:attribute name="LinkBehavior" type="xs:string" use="optional" />
            </xs:extension>
        </xs:complexContent>
</xs:complexType>
  <xs:complexType name="ImageType">
    <xs:complexContent>
        <xs:extension base="xaml:ControlType">
         <xs:attribute name="Source" type="xs:string" use="required" />
```

```
            </xs:extension>
        </xs:complexContent>
    </xs:complexType>
    <xs:complexType name="CheckBoxType">
        <xs:complexContent>
            <xs:extension base="xaml:ControlType">
        <xs:attribute name="TextAlignment" type="xs:string" use="optional" />
        <xs:attribute name="IsChecked" type="xs:string" use="optional" /
                <!-- Events -->
        <xs:attribute name="IsCheckedChanged" type="xs:string" use="optional" />
            </xs:extension>
        </xs:complexContent>
    </xs:complexType>
<!-- List Control Type -->
    <xs:complexType name="ListControlType">
        <xs:complexContent>
            <xs:extension base="xaml:ControlType">
<xs:attribute name="DisplayMemberPath" type="xs:string" use="optional" />
<xs:attribute name="SelectedValuePath" type="xs:string" use="optional" />
<xs:attribute name="SelectedValue" type="xs:string" use="optional" />
<xs:attribute name="ItemsSource" type="xs:string" use="optional" />
<xs:attribute name="SelectedIndex" type="xs:string" use="optional" />
                <!-- Events -->
        <xs:attribute name="SelectionChanged" type="xs:string" use="optional" />
        <!--
                <xs:sequence>
                    <xs:element ref="xaml:ListControlItem"
            minOccurs="0" maxOccurs="unbounded" />
                </xs:sequence>
                -->
            </xs:extension>
        </xs:complexContent>
    </xs:complexType>
    <!-- <xs:element name="ListControl" type="xaml:ListControlType"
abstract="true" /> -->
    <xs:simpleType name="ListControlItemType">
        <xs:restriction base="xs:string">
        </xs:restriction>
    </xs:simpleType>
    <xs:element name="ListControlItem" type="xaml:ListControlItemType"
abstract="true" />
    <xs:element name="ListBoxItem" type="xaml:ListControlItemType"
substitutionGroup="xaml:ListControlItem" />
    <xs:element name="ComboBoxItem" type="xaml:ListControlItemType"
substitutionGroup="xaml:ListControlItem" />
    <xs:element name="RadioButton" type="xaml:ListControlItemType"
substitutionGroup="xaml:ListControlItem" />
    <xs:complexType name="ListBoxType">
        <xs:complexContent>
            <xs:extension base="xaml:ListControlType">
                <xs:sequence>
                    <xs:element ref="xaml:ListBoxItem"
minOccurs="0" maxOccurs="unbounded" />
                </xs:sequence>
                <xs:attribute name="SelectionMode" type="xs:string"
use="optional" />
            </xs:extension>
        </xs:complexContent>
    </xs:complexType>
    <xs:complexType name="ComboBoxType">
        <xs:complexContent>
            <xs:extension base="xaml:ListControlType">
                <xs:sequence>
                    <xs:element ref="xaml:ComboBoxItem"
minOccurs="0" maxOccurs="unbounded" />
                </xs:sequence>
                <xs:attribute name="DropDownStyle"
type="xs:string" use="optional" />
            </xs:extension>
        </xs:complexContent>
    </xs:complexType>
    <xs:complexType name="RadioButtonListType">
        <xs:complexContent>
            <xs:extension base="xaml:ListControlType">
                <xs:sequence>
                    <xs:element ref="xaml:RadioButton"
minOccurs="0" maxOccurs="unbounded" />
                </xs:sequence>
            </xs:extension>
        </xs:complexContent>
```

```
</xs:complexType>
<!-- UI Elements -->
<xs:element name="Control" type="xaml:ControlType" abstract="true" />
<xs:element name="Page" type="xaml:PageType"
substitutionGroup="xaml:Control" />
<xs:element name="ObjectDataSource" type="xaml:ObjectDataSourceType" />
<xs:element name="XmlDataSource" type="xaml:XmlDataSourceType" />
<xs:element name="Panel" type="xaml:PanelType"
substitutionGroup="xaml:Control" />
<xs:element name="ListBox" type="xaml:ListBoxType"
substitutionGroup="xaml:Control" />
<xs:element name="ComboBox" type="xaml:ComboBoxType"
substitutionGroup="xaml:Control" />
<xs:element name="RadioButtonList" type="xaml:RadioButtonListType"
substitutionGroup="xaml:Control" />
<xs:element name="Label" type="xaml:LabelType"
substitutionGroup="xaml:Control" />
<xs:element name="TextBox" type="xaml:TextBoxType"
substitutionGroup="xaml:Control" />
<xs:element name="Button" type="xaml:ButtonType"
substitutionGroup="xaml:Control" />
<xs:element name="CheckBox" type="xaml:CheckBoxType"
substitutionGroup="xaml:Control" />
<xs:element name="Image" type="xaml:ImageType"
substitutionGroup="xaml:Control" />
<xs:element name="LinkLabel" type="xaml:LinkLabelType"
substitutionGroup="xaml:Control" />
<!-- Control attributes -->
<!-- Since all attribute values could actually be binding expressions therefore the
type for each attributeis xs:string -->
    <xs:attributeGroup name="ControlTypeAttributes">
        <!-- Properties -->
        <!-- Top and Left can be made required attributes but it's ok to
                have them as optional -->
  <xs:attribute name="Top" type="xs:string" default="0" use="optional" />
  <xs:attribute name="Left" type="xs:string" default="0" use="optional" />
  <xs:attribute name="Width" type="xs:string" use="optional" />
  <xs:attribute name="Height" type="xs:string" use="optional" />
  <xs:attribute name="Anchor" type="xs:string" use="optional" />
        <!-- Here we could have specfied an enumeration of Anchor values
but since this could also be a binding expression we have to leave it as a simple
string -->
     <xs:attribute name="Background" type="xs:string" use="optional" />
     <xs:attribute name="Foreground" type="xs:string" use="optional" />
     <xs:attribute name="FontFamily" type="xs:string" use="optional" />
       <xs:attribute name="FontSize" type="xs:string" use="optional" />
       <xs:attribute name="FontStyle" type="xs:string" use="optional" />
       <xs:attribute name="Name" type="xs:string" use="required" />
       <xs:attribute name="Tag" type="xs:string" use="optional" />
       <xs:attribute name="TabIndex" type="xs:string" use="optional" />
       <xs:attribute name="IsEnabled" type="xs:string" use="optional" />
       <xs:attribute name="Visibility" type="xs:string" use="optional" />
       <xs:attribute name="ToolTip" type="xs:string" use="optional" />
       <xs:attribute name="Text" type="xs:string" use="optional" />
       <!-- Events -->
       <xs:attribute name="Click" type="xs:string" use="optional" />
       <xs:attribute name="GotFocus" type="xs:string" use="optional" />
       <xs:attribute name="LostFocus" type="xs:string" use="optional" />
       <xs:attribute name="KeyUp" type="xs:string" use="optional" />
       <xs:attribute name="KeyDown" type="xs:string" use="optional" />
       <xs:attribute name="MouseUp" type="xs:string" use="optional" />
       <xs:attribute name="MouseDown" type="xs:string" use="optional"
/>
     <xs:attribute name="TextChanged" type="xs:string" use="optional"/>
  </xs:attributeGroup>
        </xs:schema>
```

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-readable storage medium having computer executable instructions for creating a metadata driven user interface, comprising:
   accessing metadata from a file represented by extensible markup language (XML) that is used in defining a user interface, wherein the metadata defines controls within the user interface that are each wrapped by a wrapper class that provides functionality for data binding and exposing properties of the control to a code-behind assembly, wherein the metadata for one or more of the controls expose an event by specifying for each of the one or more controls within the metadata a name of an event and a method name for handling the event; and wherein the metadata includes:
      an XML element binding data to a property of a control of the user interface using a binding expression, the binding expression including a data source for the data, and
      an XML element specifying an event handler for an event for a control in the code-behind assembly; wherein the event is exposed to the code-behind assembly; wherein properties of the control are accessed through the code-behind assembly;
   rendering the user interface according to the metadata.

2. The computer-readable storage medium of claim 1, the metadata further supporting mechanisms to programmatically modify the controls.

3. The computer-readable storage medium of claim 2, further comprising creating the metadata for the user interface according to a metadata schema and storing the metadata in a file.

4. The computer-readable storage medium of claim 3, wherein the metadata defines properties that are associated with the controls within the user interface and defines a layout of the controls within the user interface.

5. The computer-readable storage medium of claim 2, wherein the metadata provides the ability to define custom controls and include standard controls within the user interface.

6. The computer-readable storage medium of claim 5, wherein the binding expression in the metadata further includes specifying a mode for data binding.

7. The computer-readable storage medium of claim 6, wherein the binding expression further includes a path to data.

8. The computer-readable storage medium of claim 7, wherein the data source comprises at least one of an object data source and an XML data source.

9. The computer-readable storage medium of claim 7, wherein the metadata schema is an XML schema and provides a text box type; a button type; a link type; an image type; a check box type; a list control type; and a radio list type.

10. The computer-readable storage medium of claim 2, wherein programmatically modifying the controls comprises providing access to a type defined by the code-behind assembly.

11. The computer-readable storage medium of claim 10, wherein the type defined by the code-behind assembly is specified in the metadata.

12. The computer-readable storage medium of claim 10, further comprising exposing an object model that is configured to allow properties of the controls to be read and modified.

13. A computer-implemented method for creating a user interface using metadata, the method when executed by a computer comprising:
   accessing metadata from a file that defines controls for a user interface that are each wrapped by a wrapper class that provides functionality for data binding and exposing properties of the control to a code-behind assembly; wherein the metadata is created according to a metadata schema; wherein the metadata for one or more of the controls expose an event by specifying within the metadata a name of an event and a method name for handling the event;
   binding a data source to at least one of the controls within the user interface by specifying a binding expression, the binding expression including the data source in the metadata; wherein the data source may be selected from an object data source and an XML data source; wherein the binding expression may be used to propagate changes back to the data source from the user interface; and
   rendering the user interface according to the metadata.

14. The method of claim 13, further comprising using the metadata schema for programmatically modifying the controls and supporting event handling for the controls.

15. The method of claim 14, further comprising providing a base class for the controls.

16. The method of claim 15, wherein the wrapper class wraps each custom control.

17. The method of claim 14, wherein rendering the user interface according to the metadata comprises setting control properties as specified in the metadata for each control.

18. The method of claim 17, further comprising developing a code behind assembly which contains event handler code; specifying the code behind assembly in the metadata; and specifying an event handler that handles a particular event for a control.

19. An apparatus for rendering a user interface using metadata, comprising:
   a processor and a computer-readable medium;
   an operating environment stored on the computer-readable medium and executing on the processor;
   a data store that is configured to store a metadata file that specifies controls within a user interface that are each wrapped by a wrapper class that provides functionality for data binding and exposing properties of the control and wherein the metadata within the file includes binding expressions that are used to bind data to one or more controls of the user interface, the binding expressions including a data source; wherein the binding expressions may be used to propagate changes back to the data source from the user interface; wherein the metadata for one or more of the controls expose an event by specifying within the metadata a name of an event and a method name for handling the event; and
   a rendering engine comprising functionality that is configured to interpret the metadata and render the user interface according to the metadata.

20. The apparatus of claim 19, wherein the metadata is created according to a metadata schema that includes mechanisms to: create the controls within the user interface; programmatically modify the controls and support event handling for the controls.

* * * * *